(12) United States Patent
Neal et al.

(10) Patent No.: US 8,839,518 B1
(45) Date of Patent: Sep. 23, 2014

(54) EGR COOLER AND METHOD OF REBUILDING EXISTING COOLER

(76) Inventors: Kennieth Neal, Mesa, AZ (US); Gene Neal, Mesa, AZ (US)

( * ) Notice: Subject to any disclaimer, the term of this patent is extended or adjusted under 35 U.S.C. 154(b) by 332 days.

(21) Appl. No.: 13/328,736

(22) Filed: Dec. 16, 2011

Related U.S. Application Data (60) Provisional application No. 61/459,641, filed on Dec. 16, 2010.

(51) Int. Cl.
*B21D 53/08* (2006.01)
*B23P 15/26* (2006.01)

(52) U.S. Cl.
USPC ............. 29/890.04; 29/890.03; 29/890.038; 29/890.039

(58) Field of Classification Search
USPC ........... 29/890.03, 890.038, 890.039, 890.04; 73/23.2, 861.357, 861.355, 861.356
See application file for complete search history.

(56) References Cited

U.S. PATENT DOCUMENTS

| | | | |
|---|---|---|---|
| 3,937,196 A | 2/1976 | Cook | |
| 4,498,220 A * | 2/1985 | Fiegen et al. | 29/890.038 |
| 4,584,868 A * | 4/1986 | Jacobsen et al. | 73/23.2 |
| 5,979,246 A * | 11/1999 | Van Cleve et al. | 73/861.357 |
| 6,029,348 A * | 2/2000 | Makino et al. | 29/890.03 |
| 6,487,917 B1 * | 12/2002 | Van Cleve et al. | 73/861.357 |
| 6,598,489 B1 * | 7/2003 | Van Cleve et al. | 73/861.357 |
| 7,013,565 B1 * | 3/2006 | Zelinski | 29/890.08 |
| 7,185,642 B1 * | 3/2007 | Redon et al. | 123/568.12 |
| 7,438,123 B2 * | 10/2008 | Tadokoro | 165/164 |
| 8,240,294 B2 * | 8/2012 | Surnilla et al. | 123/568.12 |
| 8,572,962 B2 * | 11/2013 | Steurer et al. | 60/605.2 |
| 2002/0174730 A1 * | 11/2002 | Drahm et al. | 73/861.355 |

* cited by examiner

*Primary Examiner* — Richard Chang
(74) *Attorney, Agent, or Firm* — John D. Titus (57) ABSTRACT

An EGR cooler for an engine. The cooler has a housing with fittings on opposite ends for securement to mating fittings in the engine exhaust system to circulate exhaust through heat exchange tubes in the housing. Coolant inlet and outlet fittings compatible with mating fittings in the engine receive coolant and circulate the coolant in heat exchange relationship with the exhaust gas in the tubes. The cooled gas is then directed to the engine intake manifold to reduce emissions. A method of rebuilding salvaged EGR coolers is also disclosed in which the existing heat exchange components are removed from said salvaged stock EGR cooler and replaced with heat exchange tube sub-assemblies. Exhaust fittings are then welded to the ends of the housing.

4 Claims, 7 Drawing Sheets

EGR COOLER AND METHOD OF REBUILDING EXISTING COOLER

CROSS-REFERENCE TO RELATED APPLICATION

This application claims the benefit of U.S. Provisional Patent Application No. 61/459,641 filed Dec. 16, 2010, the contents of which are hereby incorporated by reference.

TECHNICAL FIELD

This description relates generally to automotive emissions devices, and more specifically to an improvement in exhaust gas re-circulation ("EGR") coolers and also relates more specifically to a method of rebuilding salvaged EGR coolers for subsequent use as replacement units having improved efficiency and durability over stock coolers.

BACKGROUND

EGR coolers have been utilized for a number of years in both combustion and spark ignition engines. The early patent to Cook, U.S. Pat. No. 3,937,196 shows an internally mounted EGR cooler. EGR coolers are currently being used on engines such as the 6.0 L POWER STROKE® and 4.5 L diesel engines as OEM components.

The EGR cooler is a component in the exhaust gas recirculation circuit or system that is typically coupled to an internal combustion engine in an effort to reduce the engine's noxious emissions. The EGR cooler collects a portion of the engine exhaust, and routs it back for re-injection into the engine intake manifold. Prior to reinjection the exhaust gas is typically cooled. Cooling re-injected exhaust tends to reduce the combustion temperature of the engine which tends to have the desired effect of reducing nitrogen oxide ("NOX") emissions. However, the reduction in NOX, typically comes at the cost of reduced engine efficiency.

The EGR cooler is a heat exchange unit that utilizes engine coolant to remove heat from the exhaust gas flowing through it. The heat exchanger design keeps the coolant and exhaust gas from mixing, but allows for heat to flow from the exhaust gas to the engine coolant. This can be achieved with a shell structure, with tubes being routed through the shell-which typically also includes a structure to facilitate heat transfer. Engine coolant is input to the EGR cooler where through the design of the heat exchange elements, heat is transferred to the coolant. The coolant and removed heat exit the EGR cooler where the coolant eventually ends up in the water jacket of the engine where it is cooled by the engine cooling system.

In summary, the EGR cooler is a heat exchange unit through which engine coolant can circulate to extract heat from a portion of the spent exhaust gases which are cooled and re-directed back to the engine intake manifold such that their re-combustion tends to reduce the creation of NOX (nitrogen oxide) vehicle emissions.

Conventional or stock EGR coolers can often fail for various reasons. Their failure may be catastrophic, or a degradation of performance. Lack of coolant flow can lead to one particular catastrophic failure mechanism, which causes excessive heat build up, and subsequent failure in the EGR cooler. The EGR cooler is designed for a particular operating temperature by the manufacturer, and if heat builds up causing the temperature to rise beyond specification the unit can fail, with disastrous results for the entire engine. Coolant supply to the EGR cooler may be reduced due to a decreased flow rate, or by blockages reducing the amount of coolant circulating.

A particular problem arises in diesel engines having an oil cooler through which coolant flows, where the oil cooler is disposed in front of the coolant input to the EGR cooler. In such a system it is typically not uncommon for coolant flow through the oil cooler to become restricted, subsequently reducing the coolant available to the EGR cooler. If coolant flow to the EGR cooler is reduced, the EGR cooler can be subjected to excessively high exhaust gas temperatures.

The resulting extreme temperature rise in the EGR cooling unit can rupture or crack the internal pathways of the EGR cooler. Ruptures can occur due to reduced coolant flow causing temperatures above the boiling point of the coolant. The coolant may "flash boil" in the EGR cooler, especially if circulation is reduced allowing the coolant to remain on the hot spot long enough to boil. Boiling can cause a rupture within the EGR cooler when the liquid coolant is suddenly turned into an expanding gas. This rupturing can lead to the mixing of the exhaust and engine coolant through the in ruptures or cracks in the EGR cooler. This type of catastrophic malfunction can cascade into the other engine systems, damaging the engine and its associated components.

Another failure causing reduced effectiveness of the EGR cooler, and degraded EGR system performance can arise due to the internal configuration of the conventional EGR cooler. In conventional OEM EGR cooler designs only a few tubes (typically oval in shape) are incorporated in the construction. The tubes may contain baffling, or thin heat exchange fins on the interior of the tube as a heat exchanging structure. Exhaust gas flows through the interiors of the tubes, and coolant flows over the exterior of the tubes and is contained in the EGR housing. The engine coolant circulates through the EGR cooler shell or housing around the exterior of the tubes and the exhaust gases flow through the interior of the tubes over the fins, cooling the exhaust gas. This finned structure can lead to another failure mechanism through clogging of the exhaust gas passage ways.

The conventional tube and fin heat exchange EGR cooler designs can become clogged over time due to a build up of particulates that can be found in the exhaust and other factors, resulting in substantially reduced heat transfer capability and higher exhaust gas temperatures in the intake manifold. The higher temperature re-circulated exhaust gas leads to increased NOX production due to higher combustion temperatures.

Accordingly, there exists a need for an improved EGR cooler that is less prone to catastrophic failure and performance degradation, including clogging in the exhaust passage ways, rupturing when coolant flow is reduced, and other failure, or performance reducing mechanisms. For efficiency's sake it is further desirable to provide a method of rebuilding salvaged conventional EGR coolers to solve the above-mentioned, and other problems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Briefly, the present invention provides an EGR cooler for diesel and other engines that may include an improved core structure. The EGR cooler of the present invention has an exterior housing which may be of various conventional configurations to facilitate convenient replacement of an existing failed EGR cooler such as OEM EGR cooler without requiring engine modifications. The configuration will depend upon the engine in which the EGR cooler is to be installed. The EGR cooler of the present invention may also be provided as an OEM unit, replacing conventional cooler designs.

The cooler housing contains a plurality of stainless steel tubes which extend axially within the housing and communicate with exhaust inlet and outlet fittings at opposite ends of the housing so the engine exhaust flows through the tubes. Coolant is directed to the housing interior at an inlet in the housing sidewall and is discharged back to the cooling system at an outlet adjacent the opposite end of the housing. The exhaust gas flows through the stainless steel tubes in heat exchange relationship with the coolant, which coolant circulates around the tubes to extract heat from the gas.

The large, cross-sectional areas of the coolant tubes within the interior of the housing allows the gas and coolant to have substantial contact surfaces for enhancement of heat exchange with minimal flow restriction. The design eliminates obstructions to flow through, reducing dwell time in the EGR cooler, minimizing the possibility of flash boiling of the gases within the EGR cooler.

The method of refurbishing or rebuilding conventional or salvaged OEM EGR coolers comprises initially removing the exhaust fittings at the opposite ends of the tubular housing providing access for removal of the existing fin and tube interior heat exchanger components. The housing is then cleaned after which replacement heat exchange sub-assemblies are inserted from the opposite ends of the housing. Each sub-assembly comprises a plurality of tubes welded to an end plate. Each end plate also has bores to receive the ends of the tubes of the sub-assembly inserted from the opposite housing end. The end plates and tubes are welded in place and any tube ends projecting beyond the end plates are cut off and the plates and tube ends are ground and finished, completing the installation of a replacement heat exchange assembly. The removed exhaust inlet and outlet fittings are welded to the opposite ends of the housing. The coolant inlet and outlet fittings generally do not have to be removed unless they are damaged and require replacement. The rebuilt EGR cooler can be installed to replace a removed OEM unit without modification to the engine as the unit size and fitting locations correspond to those of the removed unit.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

The examples below describe a unique construction of an EGR cooler that may be fabricated as a new part, and a method of fabricating the unique EGR cooler utilizing stock EGR coolers that are either new or used. The used EGR coolers may be functioning or non functioning units that are suitable for re-fabricating. Although the present examples are described and illustrated herein as being implemented in a diesel truck engine system, the system described is provided as an example and not a limitation. As those skilled in the art will appreciate, the present examples are suitable for application in a variety of different types of internal combustion engine systems, including gasoline engines, diesel engines and the like.

Figure 5:
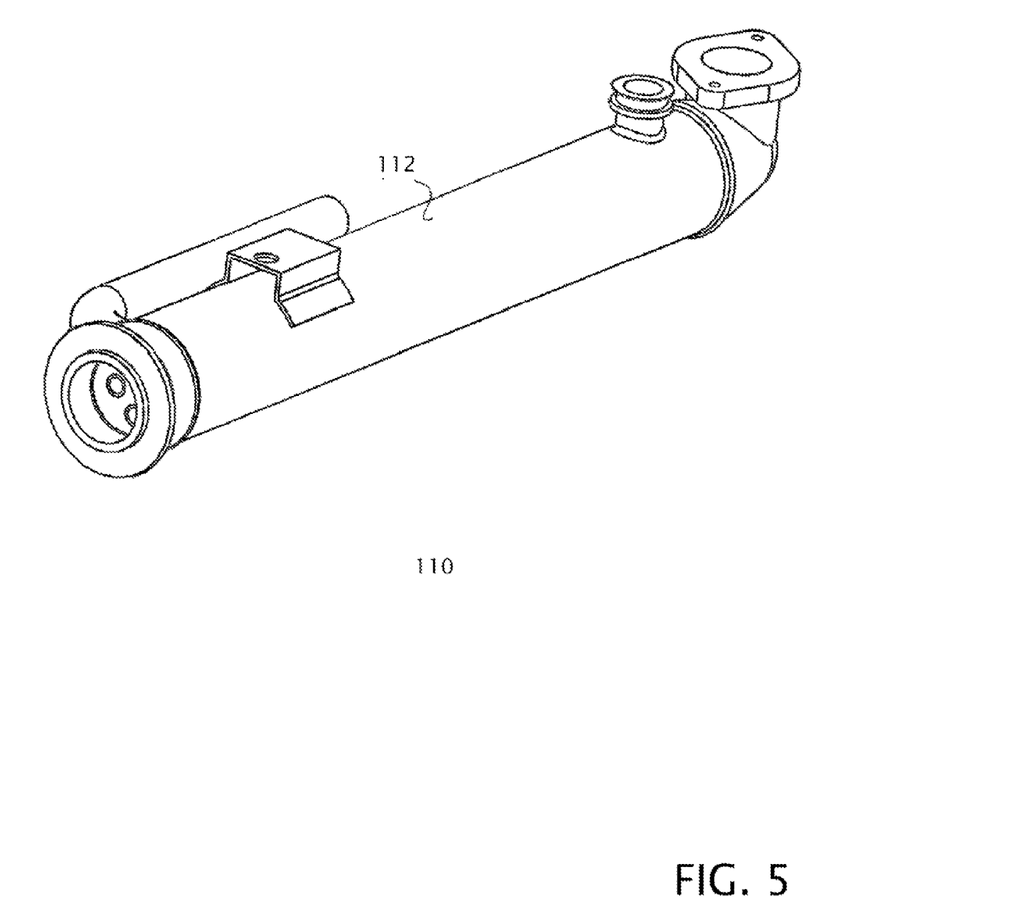
FIGS. 5 and 6 are perspective views of other embodiments of the cooler according to the present invention.
Figure 6:
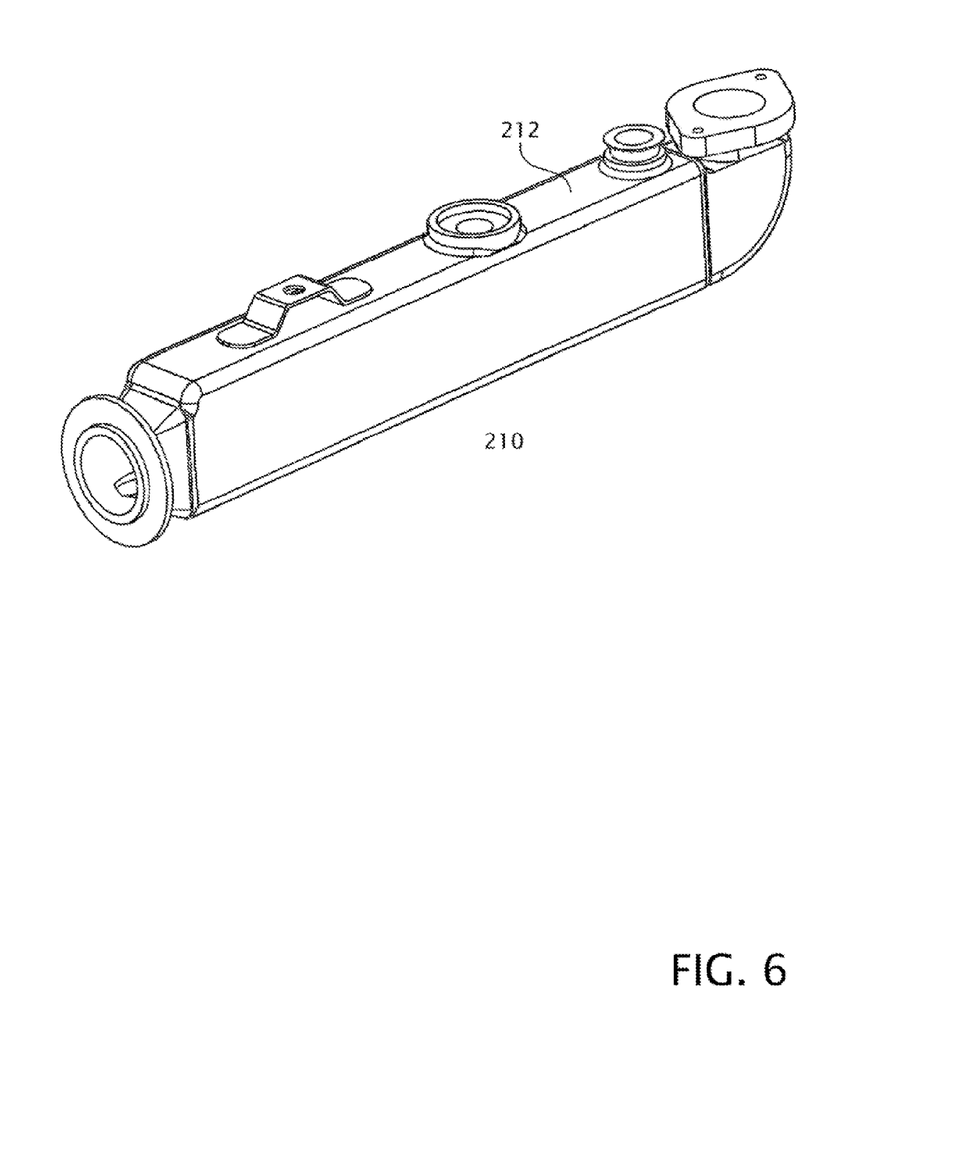

FIGS. 1-4 show an example of the specially constructed EGR cooler. FIGS. 5 and 6 show two alternative examples of specially constructed EGR coolers. Any of the examples may be fabricated as new units, or fabricated utilizing used conventional parts that are suitable for reconditioning, or remanufacturing utilizing unique parts in order to form a new specially constructed EGR cooler.

Figure 1:
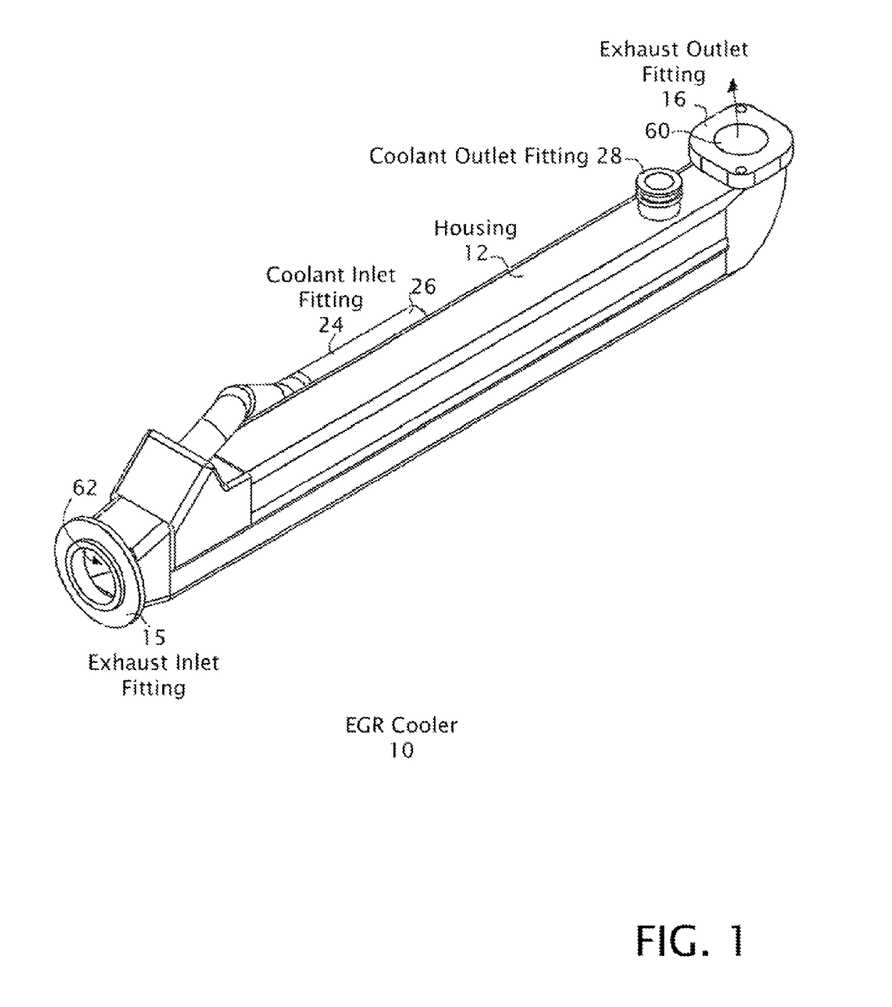
FIG. 1 is a perspective view taken from one side of an EGR cooler according to the present invention.

FIG. 1 is a perspective view taken from one side of an EGR cooler according to the present invention. The EGR cooler according to the present invention is generally designated by the numeral 10 and has a housing 12 shown as being tubular, which defines an internal heat exchange chamber, or coolant chamber (74 of FIG. 2) extending the length of the housing interior. The housing is made from suitable materials, fabricated according to methods known to those skilled in the art.

The housing 12 has a flanged exhaust inlet fitting 15 on one end of the housing and an upwardly extending flanged exhaust outlet fitting 16 on the other end of the housing. The fittings 15 and 16 are sized and located to connect to existing fittings in the engine exhaust system. In alternative examples fittings differing from those present in a stock vehicle may be utilized, such as those which might be utilized in a custom exhaust system. As constructed a portion of the exhaust is directed through the EGR cooler housing from the inlet fitting 15 to the outlet fitting 16 where it may be directed to the intake manifold. On the interior of the specially constructed EGR cooler are a plurality of large diameter tubes (20 of FIG. 2) through which a portion of the exhaust gas from the exhaust system is circulated to the outlet fitting. In the example provided six tubes are provided. The diameter of the tubes is selected to provide sufficient exhaust gas cooling based upon the flow through the number of tubes utilized. Just inside the inlet fitting 15 and outlet fitting 16 are formed chambers to separate the exhaust gas from the coolant, and to mount the plurality of tubes.

The coolant circulates within the heat exchanger chamber (74 of FIG. 2) around tubes (20 of FIG. 2) carrying the exhaust through the EGR cooler. The exhaust gas is accordingly cooled by an exchange of heat from the exhaust to the coolant. The cooled exhaust is then reintroduced to the intake manifold to be mixed with the air exchange to reduce NOX emissions.

The housing or shell its self contains coolant supplied from the engine cooling system that is introduced into the EGR cooler 10 at coolant inlet 24 located in the sidewall of the housing 12. The coolant exits the housing at coolant outlet connection 28, adjacent fitting 16. A tubular extension 26 of the inlet 24 in this particular example is adapted to connect the EGR cooler to the engine coolant system. The general shape and configuration of the housing, the location and dimensions of the exhaust gas and coolant fittings of this specially constructed EGR cooler correspond to those of a stock OEM EGR unit so replacement of an OEM unit with the EGR cooler of the present invention may be accomplished without modification to the engine.

In operation, the coolant from the engine cooling system will, under pressure of the coolant system water pump, circulate coolant from the inlet 24 through the coolant chamber (74 of FIG. 3) to the outlet 28 to be returned to the engine cooling system. Exhaust gas from the engine flows through the chamber, exiting at outlet 16, and is then directed to the engine intake manifold to be mixed with combustion air. Both the exhaust gas and coolant flow through relatively large passageways in the chamber with minimum obstruction, decreasing the dwell time and minimizing restriction issues.

Figure 2:
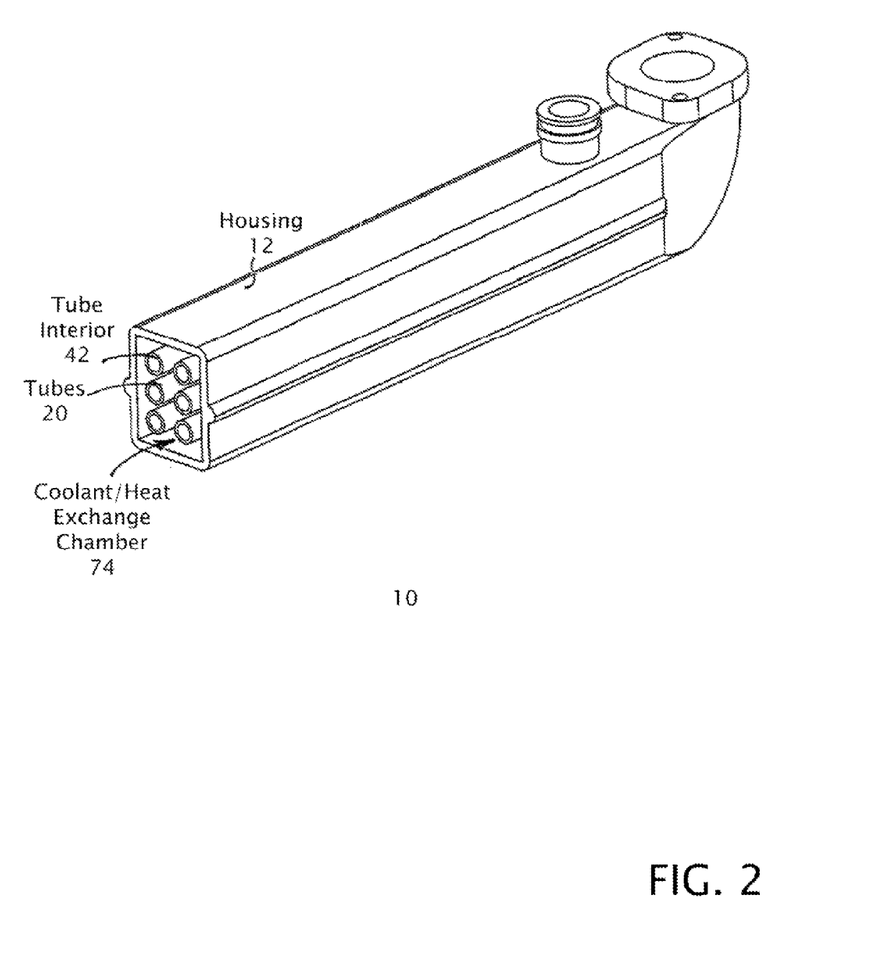
FIG. 2 is a transverse cross-section of the EGR cooler seen in FIG. 1 showing the heat exchange tube sub-assemblies.

FIG. 2 is a transverse cross-section of the EGR cooler seen in FIG. 1 showing the heat exchange tube sub-assemblies. The housing 12 contains a plurality of tubes 20, each having an internal passageway 42 through which exhaust flows. The inner passage ways are free of baffling which tends to restrict exhaust flow when contamination and debris build up on the baffling over time. Also since flow is improved with these tubes hot spots tend to be eliminated.

Figure 3:
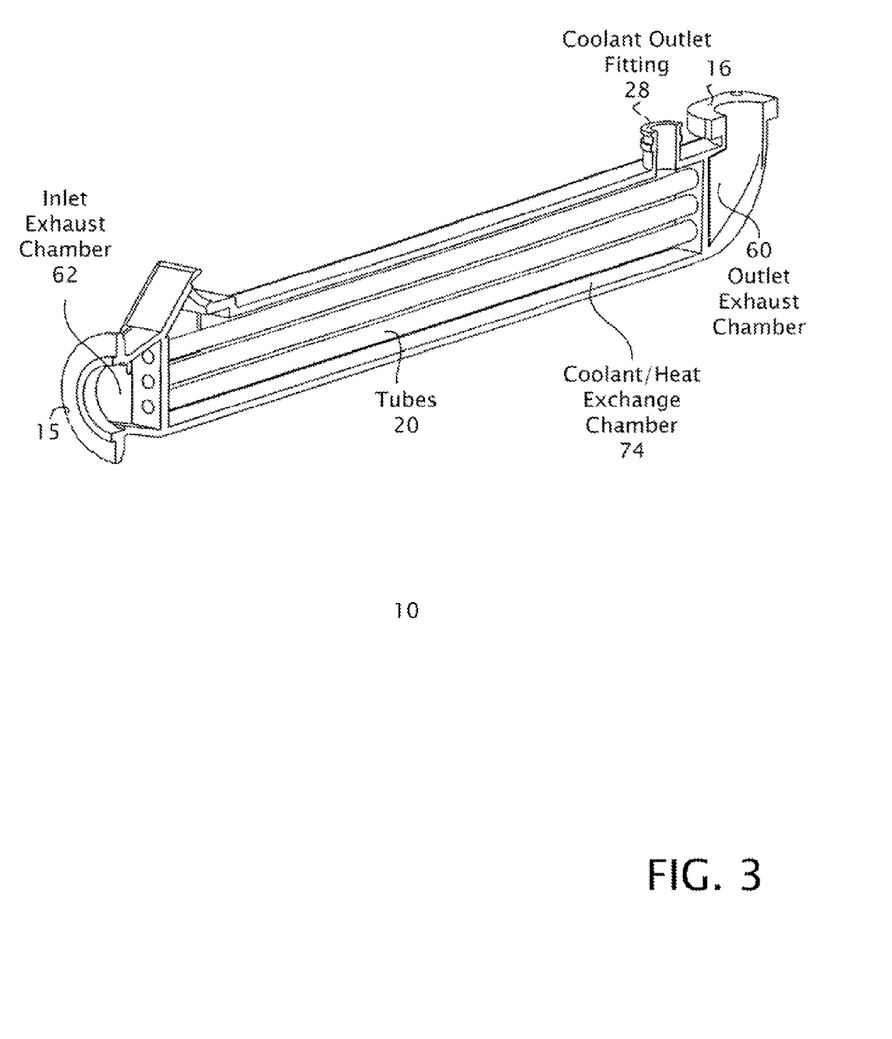
FIG. 3 is an axial cross-section of the cooler of FIGS. 1 and 2.

FIG. 3 is an axial cross-section of the cooler of FIGS. 1 and 2. At inlet 15 exhaust enters an exhaust inlet chamber 62, where it is divided into a plurality of smooth bore tubes 20. Tubes 20 are free of baffling and other heat exchange structures, and provide sufficient heat transfer to coolant disposed in coolant chamber 74. Exhaust exits the tubes 20 and enters the exhaust outlet chamber 60 where it is routed to the engine manifold (not shown) through fitting 16. Coolant circulates through the coolant chamber 74 to cool the tubes 20 and the exhaust traveling through them. The coolant exits the chamber 74 through the coolant outlet fitting 28.

Figure 4:
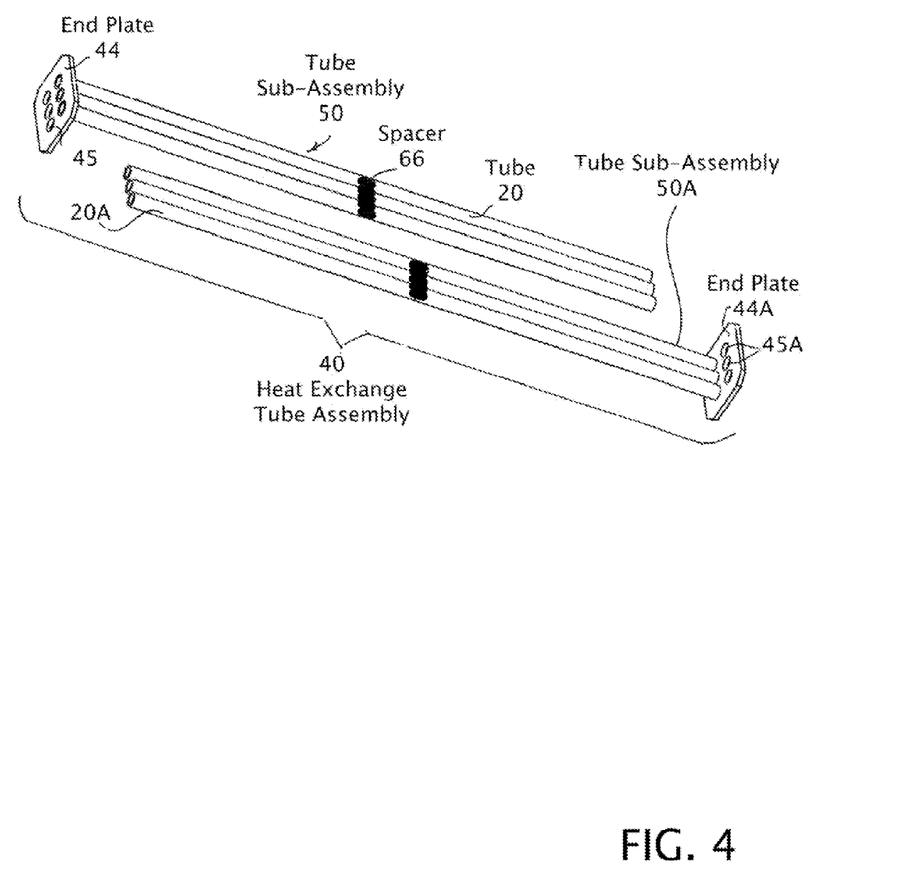
FIG. 4 is a perspective view showing the heat exchange tube sub-assemblies which are inserted into opposite ends of the housing and welded in place.

FIG. 4 is a perspective view showing the heat exchange tube sub-assemblies 50, 50A which are inserted into opposite ends of the housing (10 of FIG. 1) and welded in place. When assembled together in the EGR cooler housing they form a heat exchange tube assembly 40. The tube assembly 40 comprises a plurality of tubes 20 of stainless steel, or equivalent material, extending in spaced-apart relationship as defined by matching apertures disposed in an end plate 44, and 44A. Six tubes 20 are shown in this example.

In the example shown, the tube assembly 40 is fabricated from two tube sub-assemblies 50, 50A each having sets of three tubes 20, 20A, although any convenient number of tubes can be incorporated in the sub assemblies. Also the sub assemblies do not have to contain the same number of tubes. One end of each of the three tubes 20 of sub-assembly 50 is welded (or equivalently coupled) to end plate 44. One end of sub-assembly 50A also has three tubes 20A which are welded to end plate 44A. Note each tube sub-assembly has a spacer 66 located at an intermediate location to maintain the tubes 44 in parallel alignment and to minimize vibration. The end plates 44, 44A are sized to seal the ends of the coolant chamber (74 of FIG. 3) when assembled, and may be of any suitable shape to achieve that function.

Sub-assembly 50 is inserted from one end of chamber (74 of FIG. 3) and the other sub-assembly 50A is inserted from the opposite end of chamber (74 of FIG. 3). The end plates 44, 44A each have bores 45, 45A to receive the free ends of the opposing tube sub-assembly. The end plates 44, 44A are welded in place and the free ends of the tubes 42, 42A are welded to the opposite end plate to complete tube assembly 40.

An exhaust inlet chamber (60 of FIG. 3) and an exhaust outlet chamber (62 of FIG. 3) communicate with the respective ends of the heat exchange tubes. The inlet fitting (15 of FIG. 1) and an outlet fitting (16 of FIG. 1) are welded to the ends of the housing (12 of FIG. 1). Each fitting has a flange sized and having a bolt pattern so that it may be secured to existing mounting locations on the engine.

Once installed, the cooler will either replace an existing stock EGR cooler, or may also be used as an original equipment cooler with superior durability and heat exchange characteristics. The generous surface area of the plurality of tubes 20, 20A provide effective heat exchange and cooling of the gas passing through the tubes. The unobstructed passageways also are less subject to becoming restricted due to deposits which may occur during operation.

FIGS. 5 and 6 are perspective views of other embodiments of the cooler according to the present invention. As mentioned, the EGR cooler may be variously configured depending on the stock model to be replaced. Accordingly, FIG. 5 shows an EGR cooler 110 having a cylindrical housing 112 and in other respects the same or similar to that described with reference to FIGS. 1 to 4.

FIG. 6, again, shows an EGR cooler 210, the same or similar in construction to that shown in FIGS. 1 to 4, having a generally rectangular housing containing a plurality of heat exchange tubes 20.

The EGR coolers of FIGS. 5 and 6 are designed for compatibility with engines such as exemplary 4.5 L diesel engines and may be shorter in length than units such as the unit shown in FIGS. 1 to 4 designed for larger displacement engines such as the exemplary 6.0 L diesel.

Figure 7:
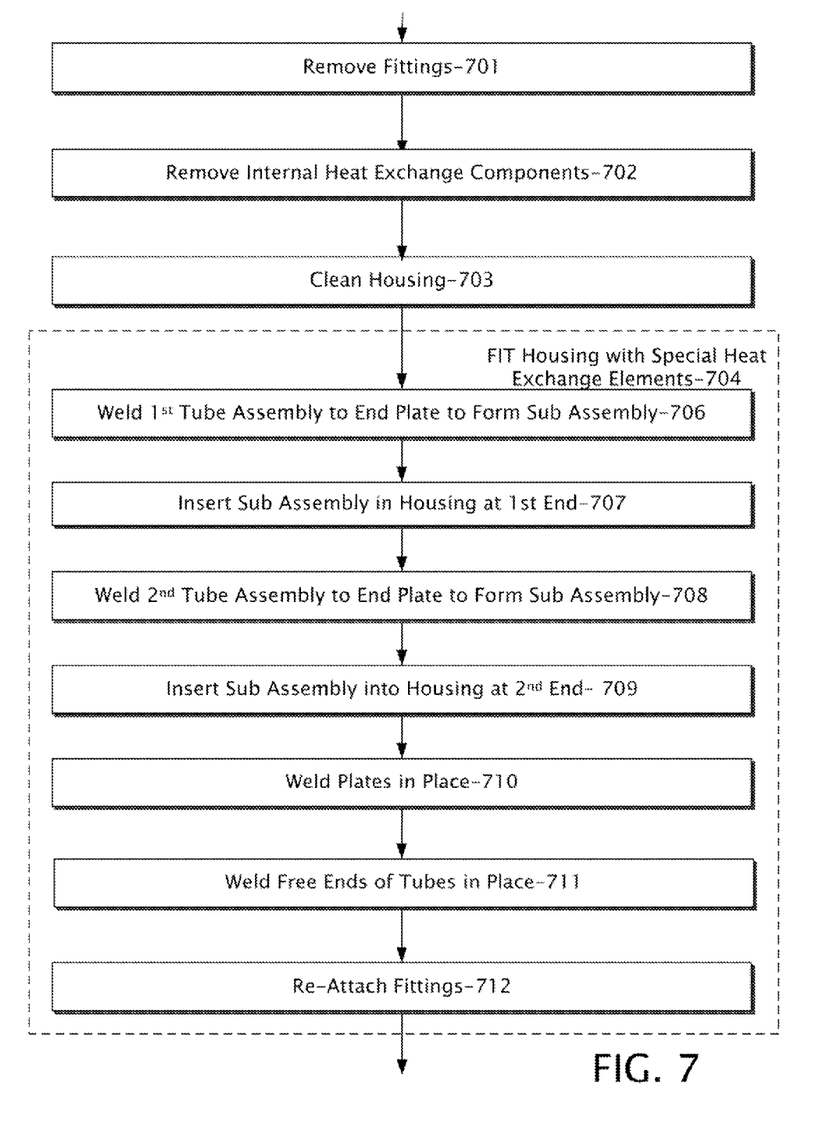
FIG. 7 shows a process flow diagram for fabricating the specially designed EGR cooler.

FIG. 7 shows a process flow diagram for fabricating the specially designed EGR cooler. The foregoing describes in detail the constructional features of the EGR cooler. These features can also be embodied in a cooler when rebuilding or refurbishing a salvaged EGR cooler that has experienced a failure. Rebuilding starts with an existing or stock EGR cooler, such as shown in FIGS. 1 to 4, which has been removed from an engine from which the housing (12 of FIG. 1) can be salvaged. In this way, the rebuilt EGR cooler will retain the same stock housing and stock exhaust and coolant fittings so the rebuilt cooler can easily be reinstalled on an engine from which the cooler has been removed with little or no modification to the engine.

The rebuilding begins by at block 701 initially removing the fittings (15, 16 of FIG. 1) on the opposite ends of the housing which connect to the exhaust system. The fittings are removed by cutting them from the ends of the tubular housing a cut-off saw or other tool. At block 702 the existing internal heat exchange components, such as the stock stacked plates, are then removed, preferably by using a hydraulic or pneumatic ram or other tool to force them from the chamber (74 of FIG. 2) of the tubular housing (12 of FIG. 1). At block 703, once the existing internal components are removed, the housing is then cleaned either by using a cleaning solution or by placing the housing in a polishing tumbler with a polishing medium.

At block 704 the clean housing is then fitted with new internal heat exchange assembly (40 of FIG. 4) with tube sub-assemblies (50, 50A of FIG. 4) having three tubes each. The process of block 704 may include a number of sub-processes. A first tube sub-assembly (50 of FIG. 4) consisting of three aligned tubes (20 of FIG. 4) is welded to an end plate (44 of FIG. 4) at block 706. At block 707 the sub-assembly is inserted into the housing chamber (74 of FIG. 3) from one end of the housing suitable tooling. At block 708 a second tube sub-assembly, which also comprises three aligned tubes (20A of FIG. 4) welded to an end plate (44A of FIG. 4). At block 709 this assembly is inserted from the opposite housing end. The end plates (44, 44A of FIG. 4) each have pre-drilled holes to receive the free ends of the tubes of the sub-assembly inserted from the opposite housing end.

At block 710 the plates (44, 44A of FIG. 4) are welded in place to the interior of the housing at opposite ends of the housing. The unwelded free tube ends, which have been inserted into the bores in the opposite end plate, are also welded in place in process block 711. Any tube ends projecting from the end plates are cut off and the tube ends and end plates are ground and finished.

At block 712, the fittings (15, 16 of FIG. 1), which are to be connected in the engine exhaust system, can now be welded to the ends of housing (12 of FIG. 1) completing the rebuilt EGR cooler which is ready for installation in an engine.

The larger tubes provide passageways for exhaust that will not easily become clogged or obstructed over a period of use and expansion and contraction is more uniform. The tube surfaces also provide a substantial area for effective heat exchange between the engine coolant and exhaust gas. Accordingly effective heat transfer may be accomplished without the need for fins, stacked plates, and other elaborate heat exchange components that are currently utilized.

The EGR cooler of the present invention, whether an OEM or rebuilt unit, provide a vital and effective component of the vehicle emission control system minimizing failures that result from flow restriction and inefficient heat exchange that occurs with many conventional EGR coolers.

It will be obvious to those skilled in the art to make various changes, alterations and modifications to the invention described herein. To the extent such changes, alterations and modifications do not depart from the spirit and scope of the appended claims, they are intended to be encompassed therein.

Those skilled in the art will realize that the process sequences described above may be equivalently performed in any order to achieve a desired result. Also, sub-processes may typically be omitted as desired without taking away from the overall functionality of the processes described above.

The invention claimed is:

1. A method of refurbishing a salvaged Exhaust Gas Recirculation cooler having a housing with internal heat exchange elements, an exhaust gas inlet fitting at a first end, an exhaust gas outlet fitting at a second end, a coolant intake and a coolant outlet, the method comprising:
(a) providing the salvaged cooler removed from an engine;
(b) cutting the exhaust gas inlet fitting and the exhaust gas outlet fitting from the cooler housing;
(c) removing the existing heat exchange elements from within the housing;
(d) cleaning the housing;
(e) providing first and second heat exchange tube sub-assemblies, each tube sub-assembly comprising an end plate having a selected number of tubes attached thereto, each of the tubes extending away from the end plate in a cantilevered configuration and terminating in a free end, the first tube sub-assembly further comprising a selected number of bores adapted to slidingly engage the outer surfaces of the tubes attached to the second tube sub-assembly, the second tube sub-assembly further comprising a selected number of bores adapted to slidingly engage the outer surfaces of the tubes attached to the first tube sub-assembly;
(f) assembling the first and second tube sub-assemblies together by inserting the free ends of the tubes of the first tube sub-assembly into the bores of the second tube sub-assembly while inserting the free ends of the tubes of the second tube sub-assembly into the bores of the first tube sub-assembly;
(g) welding the tubes in place;
(h) welding the end plates to the housing; and
(i) welding an inlet fitting and an outlet fitting to the housing to establish an exhaust gas flow path from the first end to the second end through the tubes in a heat exchange relationship with coolant flowing in the housing.

2. The method of claim 1, wherein the cleaning step is done by tumbling.

3. The method of claim 1, wherein the cleaning step is done by utilizing a cleaning solution.

4. The method of claim 1, wherein the step of removing the existing heat exchange elements from within the housing is performed with a hydraulic ram.

\* \* \* \* \*